June 28, 1927.  F. A. HALLECK  1,633,699

COMPRESSOR OR PUMPING MECHANISM

Filed March 14, 1924

Inventor:
Frank A. Halleck
by
atty.

Patented June 28, 1927.

1,633,699

UNITED STATES PATENT OFFICE.

FRANK A. HALLECK, OF MICHIGAN CITY, INDIANA, ASSIGNOR TO SULLIVAN MACHINERY COMPANY, A CORPORATION OF MASSACHUSETTS.

COMPRESSOR OR PUMPING MECHANISM.

Application filed March 14, 1924. Serial No. 699,191.

My invention relates to compressors or pumping mechanisms.

An object of my invention is to provide an improved pumping mechanism. Another object of my invention is to provide an improved pumping mechanism having improved and simplified means for assembling its parts. A further specific object of my invention is to provide an improved air compressor having automatic inlet and discharge valves and improved means for assembling them in position and holding to the cylinder of the compressor the heads thereof. These and other objects of my invention will hereinafter more fully appear.

In the accompanying drawings I have shown for purposes of illustration one form which my invention may assume in practice.

In these drawings,—

Figure 1:
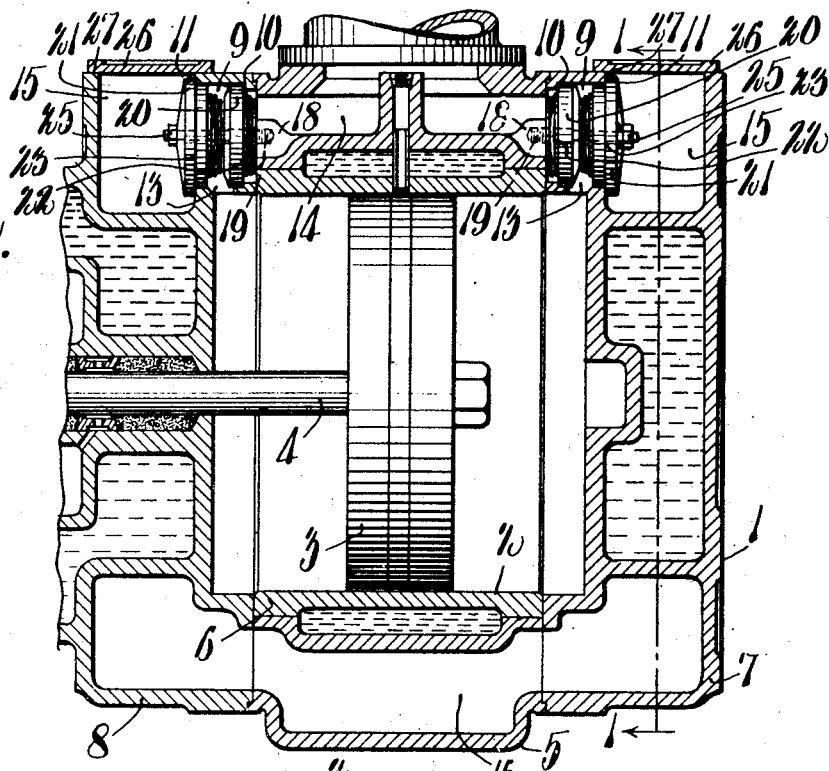
Fig. 1 is a section on a plane corresponding to the line 2—2 of Fig. 2.
Figure 2:
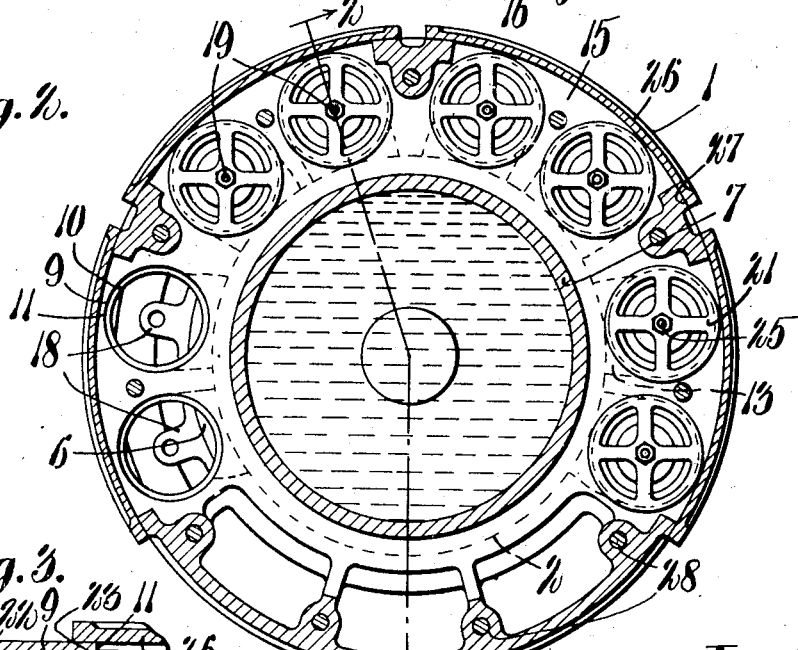
Fig. 2 is a view through the cylinder on a plane corresponding to line 1—1 of Fig. 1.
Figure 3:
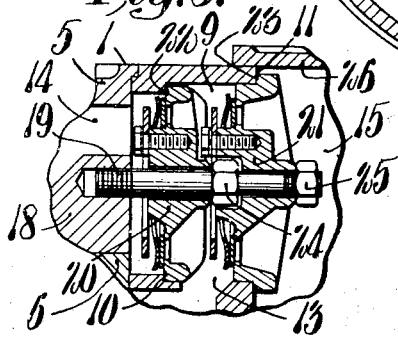
Fig. 3 is a detail sectional view through one of the valve mechanisms and fragmentary portions of the head and cylinder proper.

In the illustrative embodiment of my invention I have shown the same in a compressor which comprises a cylinder 1 having a bore 2 in which a piston 3 is reciprocable by a piston rod 4. The cylinder 1 is made up of an outer portion 5 and a liner 6 and the opposite ends of the cylinder are closed by heads 7 and 8. The cylinder heads are provided with a plurality of chambers adapted to receive valve mechanisms, these chambers being generally designated 9 and providing a plurality of shoulders 10 and 11 respectively upon which valve cage elements may seat. Communicating with each of these compartments or chambers are passages 13 which serve for the joint purpose of admitting the air to the cylinder and discharging it therefrom after it has been compressed. It will be observed that the shoulders are on opposite sides of these openings. Within the central portion of the cylinder, that is within the cylinder member proper, there is a discharge chamber 14, while the head is provided with a chamber 15 which constitutes the inlet chamber and communicates with a space 16 in the cylinder member proper. It will be observed that the cylinder member 5 is provided with a plurality of bosses 18 into which studs 19 may be threaded. Upon these studs 19 there are adapted to be seated discharge valve mechanisms 20 and inlet valve mechanisms 21, these mechanisms being shown in section in Fig. 3 and each including a seat section and a guard and having between the guard and the seat section a valve and a transversely bowed spring. Each of the elements 20 and 21, which may be identified as cage elements, is provided with a surface, these being designated respectively 22 and 23, which is adapted to cooperate with one of the surfaces 10 or 11 on the head. Suitable nuts 24 and 25 engage the cage members and draw them against the surfaces 10 and 11. It will be observed that the stud 19 is engaged in the boss 18 upon the cylinder member, that the valve cage 20 surrounds the portion of the stud nearer the cylinder, that the nut 24 draws this cage element 20 toward the cylinder and as it does so causes the surface 22 to engage the shoulder 10 and draw the cylinder head against the cylinder. Similarly a nut 25 engages the cage element 21 and draws it toward the cylinder, and by reason of the engagement of the surfaces 23 and 11 the head is also drawn toward the cylinder by these parts. The chamber 15 is accessible from the side of the cylinder head by removal of one or more arcuate closure plates 26 which cooperate with seats 27 on the head.

As a result of this construction it will be observed that I have provided common means for holding the valve cages in position and the heads on the cylinder. This results in a substantial reduction in the number of studs which needs to be used and in the general simplification of the structure. Of course in removing the head the valves will be removed. A few additional studs may be inserted in threaded openings 28 for the purpose of holding the heads in position at points where there are no valves.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a pump, a cylinder, a head therefor, a valve cage, means common to said cylinder, said head and said cage for holding said several elements assembled, and means whereby said cage is removable while said head is retained in its operative relation to said cylinder.

2. In a pump, a cylinder, a head therefor, a valve cage, means common to said several elements for holding them assembled, and auxiliary means for holding said head to said cylinder whereby said cage is removable while said head is retained in its operative relation to said cylinder.

3. In a pump, a cylinder, a head therefor, a valve cage in said head, and common tensioning means directly engaging said cage and cylinder for holding said head on said cylinder and said cage in said head.

4. In a pump, a cylinder, a cylinder head providing an opening through which a piston rod is reciprocable, a valve cage, and common means for holding said cylinder head and cage in assembled relation with respect to each other and to said cylinder.

5. In a pump, a cylinder, a head therefor, a valve cage whose axis is offset from the cylinder axis, and common means acting through said cage for holding said several elements assembled.

6. In a pump, a cylinder, a head therefor, a plurality of valve mechanisms each including a valve cage, and a plurality of holding means each common to a cage, the head and the cylinder, said holding means comprising means whereby any one of said cages may be removed while the others are retained in their operative relation to said head.

7. In a compressor, a cylinder, a head therefor, a valve cage receiving recess in said head, a valve cage in said recess so engaging said recess that pressure on said cage in the direction of the cylinder presses the head towards said cylinder, and means for holding said cage in position and causing the same to press the head towards the cylinder operatively connected with the cylinder.

8. In a compressor, a cylinder, a valve cage, a head for said cylinder having a recess to receive said cage, and means extending between said cylinder and cage for holding said head on said cylinder.

9. In a compressor, a cylinder, a valve cage, a head for said cylinder having a recess to receive said cage, and tension means extending between said cylinder and cage for holding said head on said cylinder.

10. In a compressor, a cylinder, a cylinder head providing a shoulder, a valve cage adapted to seat on said shoulder, a stud mounted in said cylinder, and means cooperating with said stud to force said valve cage against said shoulder and whereby said head against said cylinder.

11. In a compressor, a cylinder, a cylinder head providing a shoulder, a valve cage element adapted to seat on said shoulder, a second valve cage element, a threaded member fixed to said cylinder, and means cooperating therewith for holding said first mentioned cage element against said shoulder, and said second mentioned cage element in fixed relation to said first mentioned cage element.

12. In a compressor, a cylinder, a cylinder head providing a plurality of shoulders, valve cage elements adapted to seat on each of said shoulders, a stud fixed in said cylinder, and nuts cooperating with said stud to hold said first cage element against one of said shoulders and said second cage element against the other of said shoulders.

13. In a compressor, a compressor cylinder, a cylinder head providing a plurality of shoulders, a plurality of valve cage elements adapted to seat on said shoulders and when pressed thereagainst to press said head towards said cylinder, and common means carried by said cylinder for drawing each of said cages to its seat and so said head towards said cylinder.

14. In a compressor, a compressor cylinder, a cylinder head providing a plurality of shoulders in different planes, valve cages adapted to cooperate with each of said shoulders, and means for drawing each of said cages to its respective shoulder directly connected to said cylinder.

In testimony whereof I affix my signature.

FRANK A. HALLECK.

CERTIFICATE OF CORRECTION.

Patent No. 1,633,699. Granted June 28, 1927, to

FRANK A. HALLECK.

It is hereby certified that error appears in the printed specification of the above numbered patent requiring correction as follows: Page 2 line 70, claim 10, for the word "whereby" read "thereby"; and that the said Letters Patent should be read with this correction therein that the same may conform to the record of the case in the Patent Office.

Signed and sealed this 4th day of October, A. D. 1927.

Seal.

M. J. Moore,
Acting Commissioner of Patents.